(12) United States Patent
Tufts et al.

(10) Patent No.: US 6,892,469 B2
(45) Date of Patent: May 17, 2005

(54) MARKING MECHANISM FOR A TAPE MEASURE AND TAPE MEASURE INCORPORATING SAME

(76) Inventors: Bradley D. Tufts, 11340 N. 93rd Ave., Peoria, AZ (US) 85345; Donald J. Booty, Jr., 5522 E. Dusty Wren Dr., Cave Creek, AZ (US) 85331; Timothy M. Crawley, 5822 W. Purdue Ave., Glendale, AZ (US) 85302

( * ) Notice: Subject to any disclaimer, the term of this patent is extended or adjusted under 35 U.S.C. 154(b) by 0 days.

(21) Appl. No.: 10/331,364

(22) Filed: Dec. 30, 2002

(65) Prior Publication Data

US 2004/0123479 A1 Jul. 1, 2004

(51) Int. Cl.[7] .................................................. G01B 3/10
(52) U.S. Cl. ............................ 33/768; 33/761; 33/770; 33/27.031; 33/755
(58) Field of Search .......................... 33/755, 759–761, 33/768, 770, 27.031, 27.032, 668

(56) References Cited

U.S. PATENT DOCUMENTS

| | | | |
|---|---|---|---|
| 2,624,120 A | | 1/1953 | Mills |
| 2,807,886 A | * | 10/1957 | Aciego .................. 33/668 |
| 2,906,024 A | | 9/1959 | Smith |
| 3,148,455 A | * | 9/1964 | Aciego .................. 33/668 |
| 3,192,630 A | * | 7/1965 | Dineson ................. 33/42 |
| 3,336,678 A | | 8/1967 | Chamberlain et al. |
| 3,802,083 A | * | 4/1974 | Freed .................... 33/668 |
| 3,885,314 A | | 5/1975 | Banas, Sr. |
| 4,015,337 A | | 4/1977 | Taylor |
| 4,439,927 A | | 4/1984 | Elliott |
| 4,542,589 A | | 9/1985 | Yamamoto |
| 4,580,347 A | | 4/1986 | McKnight |
| 4,630,376 A | | 12/1986 | Pentecost |
| 4,667,412 A | | 5/1987 | Carlson |
| 4,729,171 A | | 3/1988 | Samson |
| 4,760,648 A | | 8/1988 | Doak et al. |
| 4,914,830 A | * | 4/1990 | Legare .................. 33/668 |
| 4,965,941 A | | 10/1990 | Agostinacci |
| 5,134,784 A | | 8/1992 | Atienza |
| 5,154,006 A | * | 10/1992 | Wooster ................. 33/768 |
| 5,295,308 A | | 3/1994 | Stevens et al. |
| 5,379,524 A | * | 1/1995 | Dawson ................. 33/768 |
| 5,416,978 A | | 5/1995 | Kaufman |
| 5,435,074 A | | 7/1995 | Holevas et al. |
| 5,477,619 A | | 12/1995 | Kearns |
| 5,577,329 A | * | 11/1996 | States ................... 33/768 |
| 5,671,543 A | | 9/1997 | Sears |
| 5,829,152 A | | 11/1998 | Potter et al. |
| 6,041,513 A | | 3/2000 | Doak |
| 6,178,655 B1 | | 1/2001 | Potter et al. |
| 6,209,219 B1 | * | 4/2001 | Wakefield et al. ........ 33/761 |
| 6,223,443 B1 | * | 5/2001 | Jacobs ................ 33/27.03 |
| 6,363,622 B1 | | 4/2002 | Stratton |
| 6,434,854 B1 | * | 8/2002 | MacColl et al. .......... 33/668 |
| 6,553,684 B2 | * | 4/2003 | Jenkins et al. ........... 33/770 |
| 6,574,881 B2 | * | 6/2003 | Cole, III ................ 33/668 |
| 6,581,296 B2 | * | 6/2003 | Ponce ................... 33/760 |
| 6,701,635 B2 | * | 3/2004 | Scarborough ............ 33/761 |
| 2002/0011006 A1 | * | 1/2002 | Smith .................... 33/668 |

* cited by examiner

*Primary Examiner*—Christopher W. Fulton
*Assistant Examiner*—Yaritza Guadalupe

(57) ABSTRACT

A measurement marking mechanism that can be coupled to a tape measure includes a case and a marker. The marker is coupled to the case and is moveable. When the case is coupled to the tape measure, the marker is moveable relative to the tape measure in a direction that is substantially perpendicular to the direction that the measurement tape is extracted from the tape measure, and in a plane that substantially parallel with, or substantially perpendicular to, the plane that the measurement tape is extracted from the tape measure. The marking mechanism may also be formed as part of a tape measure during the manufacturing process.

20 Claims, 3 Drawing Sheets

MARKING MECHANISM FOR A TAPE MEASURE AND TAPE MEASURE INCORPORATING SAME

FIELD OF THE INVENTION

The present invention relates to measurement devices and, more particularly to a marking mechanism that may be used to make a mark on an article at a particular location, and that may be used with measurement devices such as, for example, a tape measure.

BACKGROUND OF THE INVENTION

The tape measure is used by various persons, in both professional and non-professional environments. If one were to go to a construction site or enter a carpenter's shop, one may find a tape measure dutifully clamped to various workers' belts or in use making various measurements. One may also find tape measures in the garages or tool drawers of numerous homes, which may be used by the homeowners to make measurements while carrying out various and sundry projects.

In general, a tape measure may include a relatively thin, flexible metal tape that is mounted within a housing. The tape may include various indicia on one of its surfaces, which may be used to conduct various measurements. More specifically, the tape may be coiled within the housing on a spool, and may extend through an opening, such as a slot, formed in the housing. The spool may be rotationally mounted within the housing. One end of the tape may be coupled to the spool and the other, so-called free end, may include some sort of clasp or stop. This clasp or stop may inhibit the free end from entering the housing via the opening, and may also be used to hold the free end against an edge of an article being measured.

When using a tape measure, the user may hold the free end in place, or somehow engage the stop, so that the free end is fixed relative to the article being measured. The housing may then be moved relative to the free end to unreel a portion of the tape from the spool. When sufficient tape has been unreeled, the indicia on the tape may be used to determine the particular measurement and/or dimension. In some instances, the user of the tape measure may want to make a mark on the surface of the particular article being measured to indicate, for example, the location of the measured dimension. To do so, the user may use one hand to hold the tape measure in place, while using a separate marking device in the other hand to make the mark. Although this operation sounds relatively simple, in some cases, it can be cumbersome, time consuming, or both.

In the past, some devices have been implemented in an attempt to alleviate the cumbersome and time consuming marking procedure described above. For example, various tape measures and attachments have been developed that include a marker. These devices, however, also suffer certain drawbacks. In particular, many of these devices only make a dot on the surface of the article being measured, which may, in some cases, not be as legible as desired. Other devices may require the user to physically move the tape measure housing to make a mark or to draw or score a line at the desired position. This can adversely effect the accuracy of the measurement and may also be an awkward and cumbersome operation.

In addition to being potentially awkward, cumbersome, inaccurate, and illegible, some of the above-described devices and methods may not be amenable to aftermarket modification. In other words, the entire tape measure may need to be completely redesigned to incorporate the device. This can adversely affect the overall cost of the tape measure.

Hence, there is a need for a marking mechanism for a tape measure that addresses one or more of the drawbacks noted above. Namely, a marking mechanism that allows a sufficiently legible mark to be made on a surface, and the operation of which is relatively non-cumbersome and/or awkward, and/or that can be readily added to an existing tape measure and/or implemented into a tape measure during initial assembly without a significant increase in tape measure cost. The present invention addresses one or more of these needs.

SUMMARY OF THE INVENTION

The present invention provides a marking mechanism, and a tape measure that incorporates this marking mechanism, that is not cumbersome or awkward to use, that makes a legible mark on a surface, and that is readily adaptable to the vast majority of existing tape measures.

In one embodiment, and by way of example only, a measurement marking mechanism for coupling to a tape measure that has a housing and a measurement tape mounted within housing and that is extractable therefrom in at least a first direction an in at least a first plane includes a case and a marker. The case is adapted for coupling to the tape measure housing, and the marker is coupled to the case and adapted to be moveable. When the case is coupled to the tape measure housing, the marker is moveable relative to the tape measure housing in at least a second direction and in at least a second plane. The second direction is substantially perpendicular to the first direction and the second plane is at least one of substantially parallel with, and substantially perpendicular to, the first plane.

In another exemplary embodiment, a tape measure includes a housing, a measurement tape, and a marker. The measurement tape is mounted within the housing, and at least a portion of the tape is extractable from the housing in at least a first direction and in a first plane. The marker is coupled to the housing and is moveable relative to the housing in at least a second direction and in a second plane. The second direction is substantially perpendicular to the first direction, and the second plane is at least one of substantially coplanar with, and substantially parallel to, the first plane.

In yet another exemplary embodiment, a tape measure includes a housing, a measurement tape, and a marker receptacle. The measurement tape is mounted within the housing, and at least a portion of the tape is extractable from the housing in at least a first direction and in a first plane. The marker receptacle is coupled to the housing and is moveable relative to the housing in at least a second direction and in a second plane. The second direction is substantially perpendicular to the first direction and the second plane is at least one of substantially coplanar with, and substantially parallel to, the first plane.

Other independent features and advantages of the preferred tape measure and marking mechanism will become apparent from the following detailed description, taken in conjunction with the accompanying drawings which illustrate, by way of example, the principles of the invention.

DETAILED DESCRIPTION OF A PREFERRED EMBODIMENT

Figure 1:
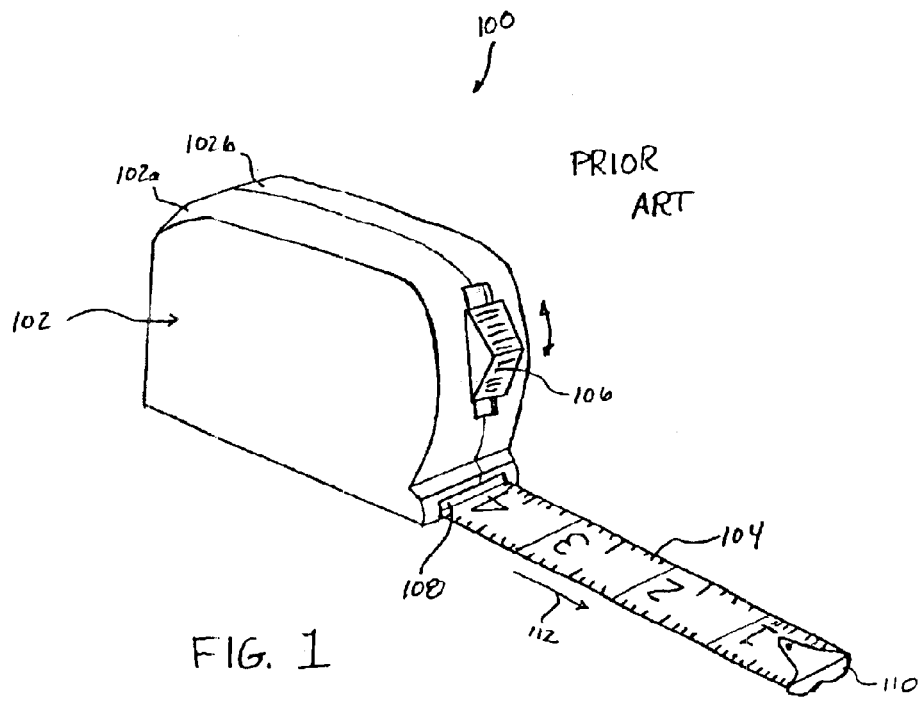
FIG. 1 is a perspective view of an exemplary conventional tape measure that may incorporate various embodiments of the present invention.
Figure 2:
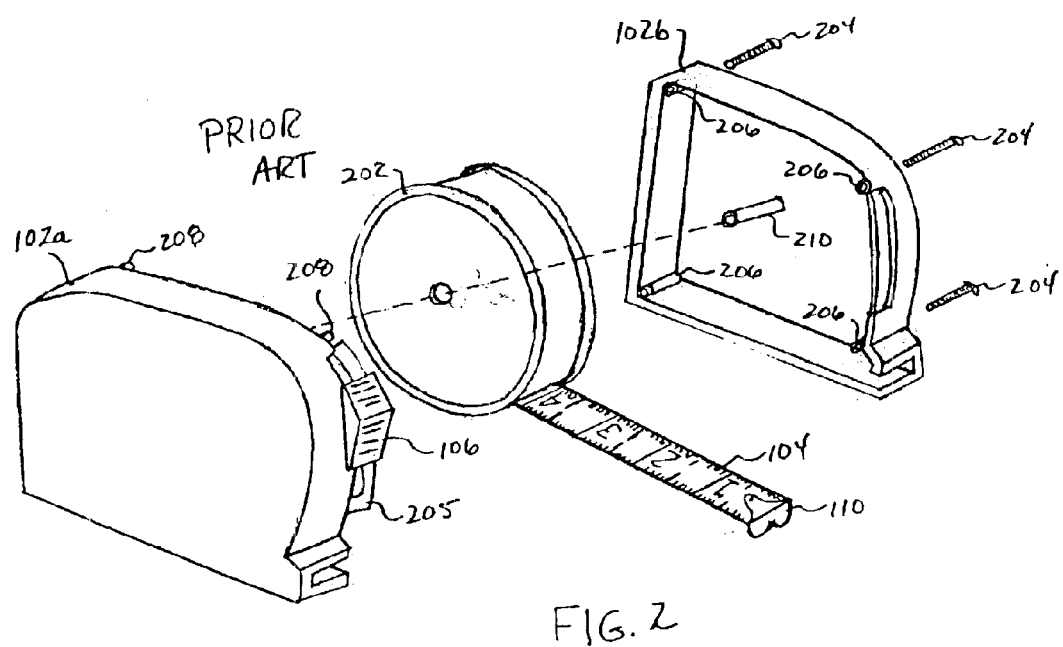
FIG. 2 is an exploded view of the tape measure depicted in FIG. 1.

An exemplary conventional tape measure is illustrated in perspective and exploded views in FIGS. 1 and 2, respectively. As these figures illustrate, the exemplary tape measure 100 includes a housing 102, a measurement tape 104, a spool 202, and a lock button 106. In the depicted embodiment, the housing 102 is constructed as an assembly of sections, including a first housing section 102a and a second housing section 102b. The first 102a and second 102b sections are coupled to one another by, for example, threaded fasteners 204. The threaded fasteners 204 are inserted into openings (not shown) in the first housing section 102a, extend through bosses 206 formed on the first housing section 102a, and are screwed into collocated threaded bosses 208 (only two shown in FIG. 2) formed on the second housing section 102b.

The measurement tape 104 is preferably formed of a thin flexible material such as, for example, metal, plastic, or fabric. The measurement tape 104 is wound around the spool 202, which is rotationally mounted within the housing 102. More particularly, the spool 202 is rotationally mounted on a shaft 210, which in the depicted embodiment is formed on the first housing section 102a. A return bias spring (not illustrated) may be included to bias spool movement in the direction that retracts the measurement tape 104 into the housing 102. Thus, the lock button 106, which is moveably mounted within the housing 102, may be moved such that an engagement end 205 thereof engages the measurement tape 104 and prevents it from retracting back into the housing 102.

One end of the measurement tape 104 is coupled to the spool 202 and the other end, the so-called free end, includes a stop 110. The stop 110 inhibits the free end of the measurement tape 104 from entering the opening 108 in the housing 102, and may also be used to hold the free end against an edge of an article being measured. As illustrated in FIG. 1, the measurement tape 104 is extractable from the housing 102, via the opening 108, in a first direction 112 and in a first plane. It will be appreciated that, although the measurement tape 104 is extractable from the housing 102 in the first direction 112 and in the first plane, once the measurement tape 104 is extracted it may be bent, twisted, or variously contorted in directions and planes other than the first direction 112 and first plane.

Figure 3:
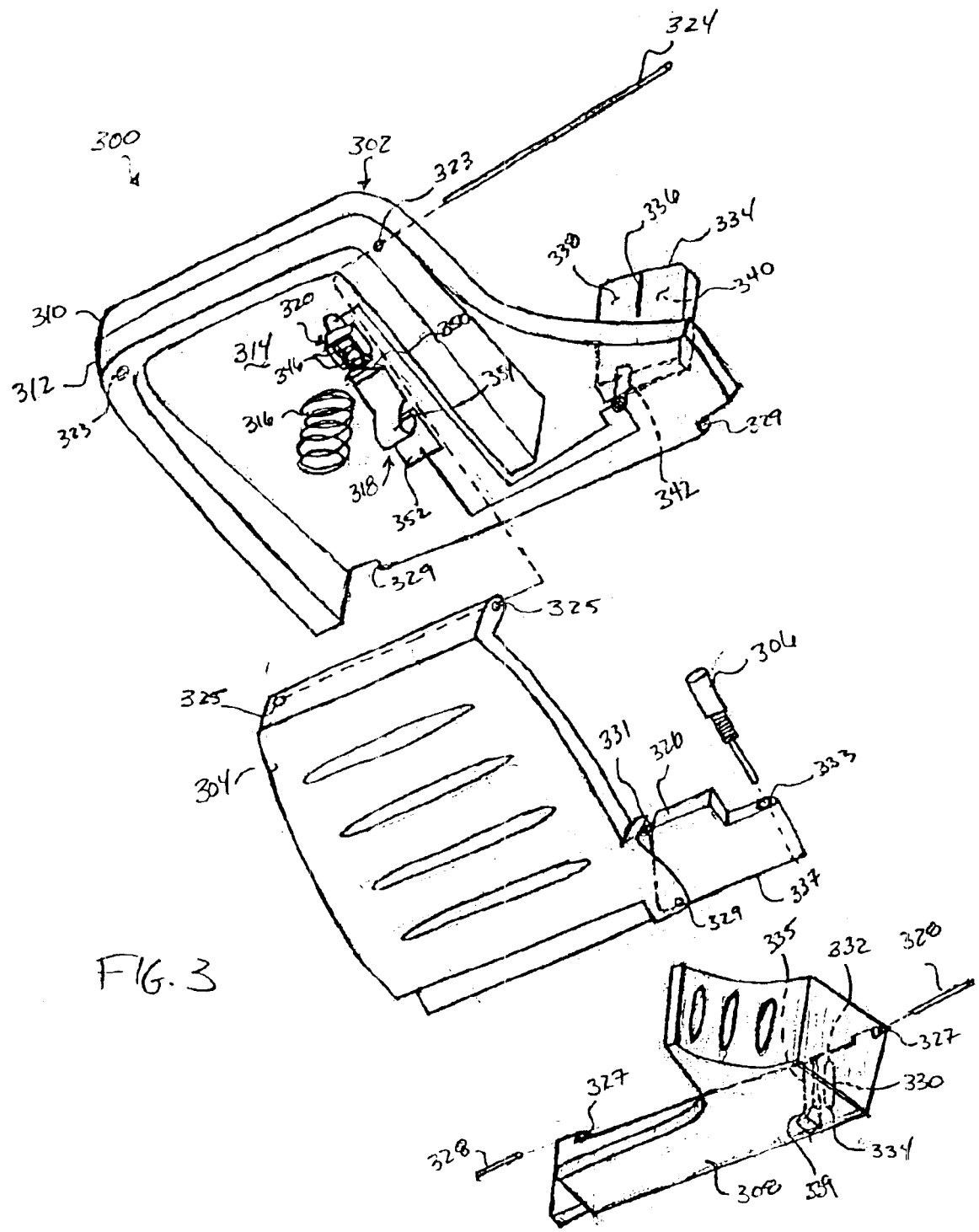
FIG. 3 is an exploded view of a measurement marking mechanism according to a preferred embodiment of the present invention for coupling to the tape measure shown in FIGS. 1 and 2.

Turning to FIG. 3, a description of the preferred marking mechanism that may be coupled to the tape measure 100 will now be provided. The marking mechanism 300 includes a case 302, an actuator 304, a marker 306, and a cover 308. The case 302 includes at least a mounting wall section 310 and a side wall section 312, which may be formed integrally or as separate pieces. When the marking mechanism 300 is coupled to the tape measure 100, the mounting wall section 310 is coupled adjacent to the tape measure housing 102.

The mounting wall section 310 also provides a mounting surface 314 onto which various components, such as an actuator bias spring 316, a switch 318, and a power source 320 may be mounted. These other components will be described in more detail below. The case side wall section 312 includes a plurality of walls that extend from the mounting wall surface and at least partially surround the mounted components 316–320.

The actuator 304 is mounted on the case 302 and, in the depicted embodiment, functions as a cover for the components 316–320 mounted on the mounting surface 314. In the depicted embodiment, the actuator 304 is mounted on the case 302 using one or more hinge pins 324 that extend through openings 323 in the case side wall section 312 and into openings 325 in the actuator 304. The hinge pins 324 allow the actuator 304 to be moveable relative to the case 302.

The marker 306 is coupled to the actuator 304 and, in a particular preferred embodiment, moves coincident with movement of the actuator 304. In the depicted embodiment, the marker 306 is coupled to the actuator 304 via a marker receptacle 326, which includes an opening 333 into which the marker 306 may be inserted. As FIG. 3 also depicts, in the preferred embodiment, the marker receptacle 326 is rotationally coupled to the actuator 304, via a pin 329. A marker receptacle spring 331 is coupled to both the actuator 304 and the marker receptacle 326. The marker receptacle spring 331 biases the marker receptacle 326, and thus the marker 306, toward the surface of the object that is being measured. The main purpose for this configuration will be discussed more fully below when the preferred cover 308 is described in more detail.

It will be appreciated that the marker receptacle 326 could be formed as an integral part of the actuator 304, and that the marker could be formed as an integral part of the marker receptacle 326. It will additionally be appreciated that the actuator 304 and marker receptacle 326 could be configured so that the movement of these components is not substantially coincident with one another. No matter the particular configuration, it will be appreciated that the marker 306 may be any one of numerous marking devices including, but not limited to, a scratching device, a pen, a pencil, a crayon, chalk, or a thermal type marking device.

Turning now to the cover 308, it is seen that it is also mounted on the case 302 and, in the depicted embodiment, is also mounted using one or more hinge pins 328. The hinge pins 328 extend through openings 327 in the cover 308 and into openings 329 formed in the case bottom section 310 to rotationally mount the cover 308 on the case 302. The cover 308 is moveable between a closed position and an open position. In the closed position, the cover encloses at least the actuator marker receptacle 326, thereby providing some protection to the marker 306 installed in the marker receptacle 326. In the open position, the cover 308 exposes the marker receptacle 326, which allows installation, removal, and/or replacement of a marker 306.

A slot 330 (shown in phantom in FIG. 3) is formed through a surface of the cover 308, and includes a near end 332 and a distal end 334. The near end 332 is the end of the slot 330 that is closer to the tape measure 100 when the marking mechanism 300 is installed onto, or manufactured as part of, the tape measure 100. The slot 330 allows at least a portion of the marker 306 to extend through the cover 308 and contact a surface of an article being measured.

In the depicted embodiment, a slide surface 335 (shown in phantom) is formed on the cover adjacent the slot 330.

The slide surface 335 preferably includes a ramped section 339 at one end. When the marking mechanism 300 is assembled, a bottom surface 337 of the marker receptacle 326 abuts the slide surface 335. As was described above, the marker receptacle 326 is preferably rotationally coupled to the actuator 304 and is spring biased via the receptacle spring 331. Thus, when the marker receptacle 326 is moved toward the distal end 334 of the slot 330, the marker receptacle 326 rides up onto the ramped section 339, and rotates slightly against the bias of the receptacle spring 331. The ramped section 339 is preferably dimensioned so that when the marker receptacle 326 is moved to the distal end 334 of the slot 330 the marker 306 does not extend through the slot 330.

An alignment plate 334 is mounted on, and extends substantially perpendicularly away from, the case mounting wall section 310. The alignment plate 334 is preferably formed of a substantially transparent material. An alignment mark 336, which is configured to also be substantially perpendicular to the case mounting wall section 310, is formed on a top surface 338 of, a bottom surface 340 of, or within, the alignment plate 334. The alignment mark 336 is positioned on the alignment plate 334 such that, were it to extend through the case 302 and into the cover 308, it would be substantially parallel with the slot 330 formed in the cover 308. Thus, when actuated, the marker 306 will make a mark on the surface of the object being measured at the same position as the alignment mark 336, though the mark may be displaced to one side of the measurement tape 104. It will also be appreciated that including the alignment plate 334 with the alignment mark 336 eliminates the need for precision positioning of the marking mechanism 300, when coupling it to the tape measure 100.

A small light source 342 (shown in phantom) such as, for example, a light emitting diode (LED) may be mounted adjacent the alignment plate 334, and preferably adjacent the alignment plate bottom surface 340. The light source 342 may be mounted to the alignment plate 334, the case mounting section 310, or any other suitable location.

Returning now to the actuator 304, it is noted that it is moveable between at least a first position and a second position. In the first position, the actuator 304 causes the marker 306 to be displaced a first distance from the slot near end 332. In the second position, the actuator 304 causes the marker 306 to be displaced a second distance from the slot near 332. It is noted that the second distance is smaller than the first distance, and may be zero, such that at least a portion of the marker 306 contacts the slot near end 332. It is also noted that when the actuator is in the first position, the marker 306 may contact the slot distal end 334, though this is not a necessary configuration. It will be appreciated that the length of the slot 330, and the specific and relative positions of the actuator first and second positions may vary, and that the actuator 304 may be configured to move to more than two positions.

Moving now to the previously-mentioned mounted components, as was noted above, the actuator bias spring 316 is mounted on the surface 314 of the case mounting section 310. The actuator bias spring 316 is configured to bias the actuator 304 toward the first position. It will be appreciated that the actuator bias spring 316 could also be mounted on the inside surface of the actuator 304, or on both the actuator 304 and the case mounting section 310. It will additionally be appreciated that more than one actuator bias spring 316 could be included.

As was also previously noted, the switch 318 and the power source 320 are mounted on the surface 314 of the case mounting section 310. The power source 320 may be any suitable electrical power source, but in the depicted embodiment it is one or more batteries 346 mounted in a battery housing 348. The power source 320 is electrically coupled in series between the switch 318 and the light source 342. The switch 318 may be any one of numerous switch designs that implements at least an open-switch and a closed-switch functionality. In the depicted embodiment, the switch 318 includes a first terminal 350 that is electrically coupled to the power source 320, and a second terminal 352 that is electrically coupled to the light source 342. The switch first terminal 350 includes an electrically conductive spring metal contact 354. When the spring metal contact 354 contacts the switch second terminal 352, the switch 318 is closed and the power source 320 supplies electrical power to the light source 342. It is noted that the switch 318 is configured such that it is in the open position when the actuator 304 is in at least its first position, and the switch 318 is moved to the closed position when the actuator 304 is moved to at least the second position. Thus, when the actuator 304 is moved to the second position, the area under the alignment plate 334 is illuminated. It will be appreciated that the switch 318 and actuator 304 may be configured so that the switch 318 is closed when the actuator 304 is moved only slightly toward its second position. With this latter configuration, the measurement tape 104 can be illuminated without making a mark, or making only a very small mark.

Figure 4:
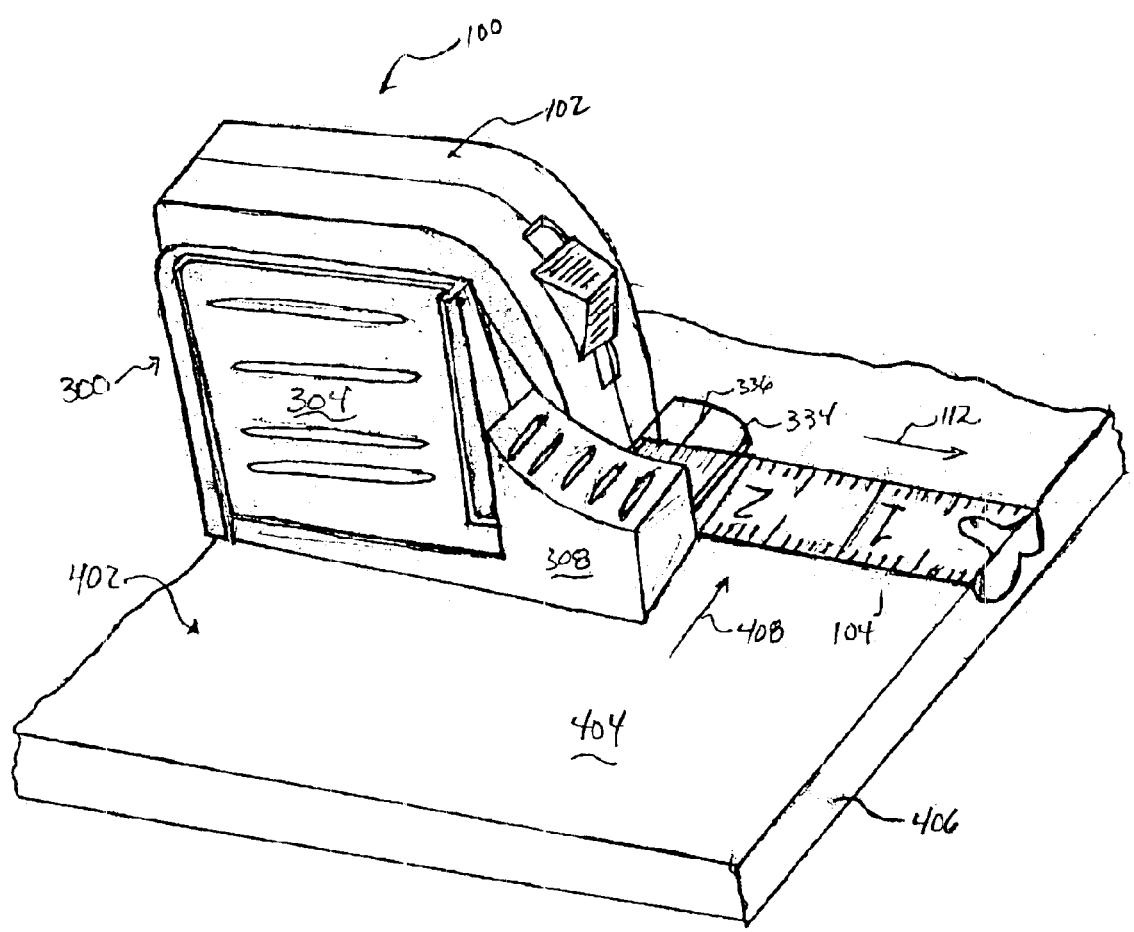
FIG. 4 is a perspective view of a tape measure with the preferred marking mechanism of FIG. 3 coupled thereto and in a configuration to measure and mark a dimension on an article.

With reference now to FIG. 4, which depicts the tape measure 100 with the marking mechanism 300 coupled thereto and in a configuration to measure and mark a dimension on an article 402, the operation of the marking mechanism 300 will be described. A user extracts the measurement tape 104 from the housing 102 a desired distance, and rests the housing 102 on a surface 404 of the article 402. As is generally known, this may be done fully manually or by hooking the stop to an edge 406 of the article 402 and moving the housing 102 away from the edge 406. The user may use the alignment mark 336 on the alignment plate 334 to ensure that a mark will be made at the desired distance, by aligning the mark 336 with the desired indicia on the measurement tape 104.

When the user wishes to make a mark on the surface 404, the user depresses the actuator 304. Depressing the actuator 304 closes the switch 318, which energizes the light source 342, and causes the marker 306 to move in a second direction 408 and in a second plane. As the marker 306 moves, it makes a mark on the article surface 404. It is noted that the second direction 408 is substantially perpendicular to the first direction 112, and the second plane, depending upon the particular configuration, may be either substantially coplanar with, or substantially parallel to, the first plane. The user may then release the actuator 304, which will return the marker 306 to its original position, and will open the switch 318, de-energizing the light source 342.

It will be appreciated that the marking mechanism 300 may be mounted to the tape measure 100 using any one of numerous coupling techniques including, but not limited to, adhesive, tape, hook-and-loop type fabric, or fasteners. It will additionally be appreciated that the tape measure 100 could be manufactured to include the marking mechanism 300.

The marking mechanism described herein allows a user to make a legible mark on a surface, is not cumbersome or awkward to use, is readily adaptable to an existing tape measure, or may be readily incorporated during manufacture of a tape measure. Moreover, the preferred configuration and placement of the marking mechanism on a tape measure provides for relatively easy and comfortable operation by a user.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A measurement marking mechanism for coupling to a tape measure having a housing including an opening, and a measurement tape mounted within the housing that is extractable therefrom, via the opening, in at least a first direction and in at least a first plane that is one of substantially parallel to, or substantially co-planar with, the opening, the mechanism comprising:

a case adapted for coupling to the tape measure housing; and a marker coupled to the case and adapted to be moveable, wherein, when the case is coupled to the tape measure housing, the marker is moveable relative to the tape measure housing in at least a second direction and in at least a second plane, the second direction being substantially perpendicular to the first direction and the second plane being at least one of substantially parallel to, or substantially coplanar with, the first plane.

2. The mechanism of claim 1, further comprising:

an actuator mounted on the case and operably coupled to the marker, at least a portion of the actuator moveable in the second direction, wherein movement of at least a portion of the actuator in the second direction causes movement of the marker in the second direction.

3. The mechanism of claim 2, wherein the marker is moveable between at least a first position and a second position, and wherein the mechanism further comprises:

an actuator spring mounted in the casing and operably coupled to the actuator, whereby the actuator spring biases the marker toward the first position.

4. The mechanism of claim 2, further comprising:

an electric power source mounted within the case;

a light mounted proximate the marker; and a switch operably coupled to the actuator and operable to selectively electrically couple the light to the power source upon movement of the actuator in the second direction to thereby energize the light.

5. The mechanism of claim 2, further comprising:

a marker receptacle mounted within the case, the marker receptacle including an opening for removably receiving the marker therein.

6. The mechanism of claim 5, wherein the marker receptacle is rotationally coupled to the actuator and has a bottom surface, and wherein the mechanism further comprises:

a marker receptacle spring coupled between the marker receptacle and the actuator, the marker receptacle spring biasing the marker receptacle in a substantially third direction that is substantially perpendicular to the first and second directions; and a ramped section formed on the case and contacting the marker receptacle bottom surface in at least one position of the marker receptacle to thereby move the marker receptacle in a fourth direction that is opposite the third direction.

7. The mechanism of claim 1, further comprising:

a substantially transparent alignment element mounted to the casing proximate the marker; and a line formed on a surface of the alignment element and oriented substantially perpendicular to the first direction.

8. A measurement marking mechanism for coupling to a tape measure having a housing including an opening, and a measurement tape mounted within the housing that is extractable therefrom, via the opening, in at least a first direction and in at least a first plane that is one of substantially parallel to, or substantially co-planar with, the opening, the mechanism comprising:

a case adapted for coupling to the tape measure housing;

a marker receptacle coupled to the case and adapted to be moveable, wherein, when the case is coupled to the tape measure housing, the marker receptacle is moveable relative to the tape measure housing in at least a second direction and in at least a second plane, the second direction being substantially perpendicular to the first direction and the second plane being at least one of substantially parallel to, and substantially coplanar with, the first plane.

9. The mechanism of claim 8, comprising:

a marker received within the marker receptacle and operable to form a mark on a surface upon movement of the marker receptacle in the second direction.

10. A measurement marking mechanism for coupling to a tape measure having a housing and a measurement tape mounted within housing that is extractable therefrom in at least a first direction an in at least a first plane, the mechanism comprising:

a case adapted for coupling to the tape measure housing;

a marker coupled to the housing and adapted to be moveable, when the case is coupled to the tape measure housing, relative to the tape measure housing in at least a second direction and a third direction and in at least a second plane, the second direction being substantially perpendicular to the first direction and the second plane being at least one of substantially parallel to, and substantially coplanar with, the first plane;

an actuator mounted on the case and operably coupled to the marker, at least a portion of the actuator moveable in the second and third directions;

an actuator spring mounted in the case and operably coupled to the actuator, whereby the actuator spring biases the marker in the third direction and toward the first position;

an electric power source mounted within the case;

a light mounted proximate the marker; and a switch operably coupled to the actuator and operable to selectively electrically couple the light to, and electrically decouple the light from, the power source upon movement of at least a portion of the actuator in the second plane, wherein movement of at least a portion of the actuator in the second and third directions causes movement of the marker in the second and third directions, respectively, and, wherein movement of at least a portion of the actuator in the second and third directions electrically couples the light to the power source and electrically decouples the light from the power source, respectively.

11. A tape measure, comprising:

a housing including an opening;

a measurement tape mounted within the housing, at least a portion of the tape extractable from the housing, via the opening, in at least a first direction and in a first plane that is one of substantially parallel to, or substantially co-planar with, the opening;

a marker coupled to the housing and configured to at least translate relative to the housing in at least a second direction and in a second plane, the second direction being substantially perpendicular to the first direction and the second plane being at least one of substantially coplanar with, and substantially parallel to, the first plane.

12. The tape measure of claim 11, further comprising:

an actuator mounted on the housing and operably coupled to the marker, at least a portion of the actuator moveable in the second direction, wherein movement of at least a portion of the actuator in the second direction causes movement of the marker in the second direction.

13. The tape measure of claim 12, wherein the marker is further moveable in at least a third direction in the second plane, and between at least a first position and a second position, and wherein the tape measure further comprises:

an actuator spring mounted in the housing and operably coupled to the actuator, whereby the actuator spring biases the marker in the third direction and toward the first position.

14. The tape measure of claim 12, further comprising:

an electric power source mounted within the housing;

a light mounted proximate the marker and operable to illuminate at least a portion of the measurement tape when at least a portion of the measurement tape is extracted from the housing; and a switch operably coupled to the actuator and operable to selectively electrically couple the light to the power source upon movement of the actuator in the second direction.

15. The tape measure of claim 12, further comprising:

a marker receptacle mounted within the housing, the marker receptacle including an opening for removably receiving the marker therein.

16. The tape measure of claim 15, wherein the marker receptacle is rotationally coupled to the actuator and has a bottom surface, and wherein the tape measure further comprises:

a marker receptacle spring coupled between the marker receptacle and the actuator and operable to bias the marker receptacle in a substantially third direction that is substantially perpendicular to the first and second directions; and a ramped section formed on the case and contacting the marker receptacle bottom surface in at least one position of the marker receptacle to thereby move the marker receptacle in a fourth direction that is opposite the third direction.

17. The tape measure of claim 11, further comprising:

a substantially transparent alignment element mounted to the housing proximate the marker; and a line formed on a surface of the alignment element and oriented substantially perpendicular to the first direction, wherein at least a portion of the line is positioned above the measurement tape when at least a portion of the measurement tape is extracted from the housing.

18. A tape measure, comprising:

a housing including an opening;

a measurement tape mounted within the housing, at least a portion of the tape extractable from the housing, via the opening, in at least a first direction and in a first plane that is one of substantially parallel to, or substantially co-planar with, the opening;

a marker receptacle coupled to the housing and moveable relative to the housing in at least a second direction and in a second plane, the second direction being substantially perpendicular to the first direction and the second plane being at least one of substantially coplanar with, and substantially parallel to, the first plane.

19. The tape measure of claim 18, comprising:

a marker received within the marker receptacle and operable to form a mark on a surface upon movement of the marker receptacle in the second direction.

20. A tape measure, comprising:

a housing;

a measurement tape mounted within the housing, at least a portion of the tape extractable from the housing in at least a first direction and in a first plane;

a marker coupled to the housing and moveable relative to the housing in at least a second and a third direction and in a second plane, the second and third directions being substantially perpendicular to the first direction and the second plane being at least one of substantially coplanar with, and substantially parallel to, the first plane;

an actuator mounted on the housing and operably coupled to the marker, at least a portion of the actuator moveable in the second and third directions;

an actuator spring mounted in the housing and operably coupled to the actuator, whereby the actuator spring biases the marker in the third direction and toward the first position;

an electric power source mounted within the housing;

a light mounted proximate the marker and operable to illuminate at least a portion of the measurement tape when at least a portion of the measurement tape is extracted from the housing; and a switch operably coupled to the actuator and operable to selectively electrically couple the light to, and electrically decouple the light from, the power source upon movement of at least a portion of the actuator in the second plane, wherein movement of at least a portion of the actuator in the second and third directions causes movement of the marker in the second and third directions, respectively, and, wherein movement of at least a portion of the actuator in the second and third directions electrically couples the light to the power source and electrically decouples the light from the power source, respectively.

* * * * *